(12) United States Patent
Fleytman

(10) Patent No.: US 6,582,338 B1
(45) Date of Patent: Jun. 24, 2003

(54) DIFFERENTIAL UNIT WITH WORM GEARSETS

(75) Inventor: Yakov Fleytman, Orion, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/685,735

(22) Filed: Oct. 11, 2000

Related U.S. Application Data

(60) Provisional application No. 60/159,888, filed on Oct. 15, 1999.

(51) Int. Cl.[7] ................................................ F16H 48/06
(52) U.S. Cl. ...................................................... 475/227
(58) Field of Search ................................ 475/226, 227, 475/344, 236, 242

(56) References Cited

U.S. PATENT DOCUMENTS

| | | | |
|---|---|---|---|
| 548,860 A | | 10/1895 | Ames |
| 1,273,957 A | * | 7/1918 | Ungar ......................... 475/226 |
| 1,903,318 A | | 4/1933 | Wildhaber |
| 1,941,645 A | * | 1/1934 | Walter ......................... 475/226 |
| 1,980,237 A | | 11/1934 | Trbojevich |
| 2,859,641 A | * | 11/1958 | Gleasman |
| 2,898,778 A | * | 8/1959 | Ransom ....................... 475/226 |
| 3,220,284 A | | 11/1965 | Horvath |
| 3,535,948 A | | 10/1970 | Winzeler |
| 3,597,990 A | | 8/1971 | McCartin |
| 3,711,910 A | | 1/1973 | Strejc |
| 3,875,635 A | | 4/1975 | Pavlov et al. |
| 3,895,700 A | | 7/1975 | Kerr |
| 3,977,632 A | | 8/1976 | Watson |
| 4,047,449 A | | 9/1977 | Popov |
| 4,489,625 A | | 12/1984 | White |
| 4,491,035 A | * | 1/1985 | Gleasman et al. .......... 475/227 |
| 4,630,497 A | * | 12/1986 | Nelson ......................... 74/425 |
| 4,632,337 A | | 12/1986 | Moore |
| 4,685,346 A | | 8/1987 | Brackett |
| 4,697,476 A | | 10/1987 | Maxwell |
| 4,783,023 A | | 11/1988 | Jupe |
| 4,907,672 A | | 3/1990 | Muzzarelli |
| 4,973,295 A | | 11/1990 | Lee |

(List continued on next page.)

FOREIGN PATENT DOCUMENTS

| | | |
|---|---|---|
| DE | 2415859 | 10/1975 |
| DE | 3435219 A1 | 5/1985 |
| DE | 3428865 C1 | 9/1985 |

OTHER PUBLICATIONS

Bryant and Dudley, Which Right–Angle Gear System?, pp. 44–55, prior 1970.*

Primary Examiner—Richard M. Lorence
Assistant Examiner—Roger Pang
(74) Attorney, Agent, or Firm—Harness, Dickey & Pierce P.L.C.

(57) ABSTRACT

A worm differential gear mechanism is provided utilizing a double enveloping worm/worm gear transmission. The double enveloping worm/worm gear transmission has an increased torque capacity in comparison with standard worm differential gear mechanisms.

8 Claims, 16 Drawing Sheets

U.S. PATENT DOCUMENTS

| | | | |
|---|---|---|---|
| 4,998,385 A | | 3/1991 | Umezono et al. |
| 5,015,898 A | | 5/1991 | Frey |
| 5,018,403 A | | 5/1991 | Umezono et al. |
| 5,033,996 A | | 7/1991 | Frey |
| 5,074,831 A | * | 12/1991 | Parigger ............... 475/226 |
| 5,081,885 A | | 1/1992 | Shaffer |
| 5,112,284 A | * | 5/1992 | Dye ................ 475/227 X |
| 5,195,934 A | * | 3/1993 | Ichiki et al. ............ 475/227 |
| 5,232,415 A | * | 8/1993 | Brewer et al. .......... 475/227 |
| 5,265,488 A | | 11/1993 | Yang |
| 5,302,159 A | * | 4/1994 | Dye et al. ............. 475/227 |
| 5,338,267 A | | 8/1994 | Takahashi et al. |
| 5,353,889 A | | 10/1994 | Hamada |
| 5,358,459 A | * | 10/1994 | Lin ................. 475/226 X |
| 5,453,062 A | * | 9/1995 | White et al. ........... 475/227 |
| 5,524,461 A | * | 6/1996 | Nielsen et al. ............ 66/210 |
| 5,620,389 A | | 4/1997 | Sato |
| 5,647,790 A | | 7/1997 | Horiutchi |
| 5,836,076 A | * | 11/1998 | Duta et al. ............. 74/606 R |
| 5,988,006 A | | 11/1999 | Fleytman |
| 5,992,259 A | | 11/1999 | Fleytman |
| 6,074,322 A | | 6/2000 | Fleytman |
| 6,093,126 A | | 7/2000 | Fleytman |
| 6,098,480 A | | 8/2000 | Fleytman |
| 6,148,683 A | | 11/2000 | Fleytman |

* cited by examiner

DIFFERENTIAL UNIT WITH WORM GEARSETS

This application claims the benefit of provisional application Ser. No. 60/159,888 filed Oct. 15, 1999.

FIELD OF THE INVENTION

The present invention relates generally to differentials, and more particularly to a differential equipped with worm gearsets.

BACKGROUND OF THE INVENTION

Differentials equipped with worm gearsets, such as that shown in U.S. Pat. No. 5,338,267, are known in the art. As is seen, the worm gearsets include a meshed worm and worm gear. One or more such worm gearsets are used in worm differentials to provide power transfer and speed differentiation features. However, the torque capacity of such worm differentials has limited their applications due to the low torque capacity associated with conventional worm gearsets.

As is common throughout the automotive industry, efforts are being made to reduce the size and weight of automobile components. The reduced weight helps improve fuel economy while the reduced size increases packaging efficiency. With regard to worm differentials, the size of the worm and worm gears as well as the number of worm gearsets that are required impact the overall size and weight of the differential. However, a reduction in size and weight of the gear components of a worm differential results in an undesirable decrease in the torque capacity of the differential unit.

Accordingly, it is desirable in the art of worm differentials to provide a differential unit which can be made with reduced size and weight but which does not have an associated undesirable decrease in torque capacity.

SUMMARY OF THE INVENTION

It is an object of the present invention to provide a worm-type differential unit which has a higher torque capacity than comparably sized standard worm differentials.

It is another object of the present invention to provide a worm differential unit which can be made smaller and lighter in weight than conventional worm differentials without the reduction in torque capacity associated with reducing the size and weight of the gear components.

Accordingly, the present invention provides a worm differential unit including a differential case adapted to be driven rotationally via a drive gear fixed thereto. A pair of worm gears are supported by the differential case with each worm gear adapted for connection to a corresponding axle shaft. The worm gears are arranged coaxially and are independently rotatable. Paired sets of compound gears are also supported by the differential case. Each of the compound gears has a first segment which matingly engages with one of the enveloping worm gears and a second segment which matingly engages with a corresponding second segment of the other compound gear of the pair. The first segment of each compound gear is an enveloping-type worm. The use of a double enveloping worm/worm gear transmission allows for surface contact between the thread of the worm and the teeth of the worm gear so that a greater torque capacity can be obtained in comparison to the line contact which is obtained with the standard worm gearsets. In addition, the use of double enveloping worm and worm gears allows the gear elements to be mounted on an axis which is closer to the axis of the axle shafts. Furthermore, because of the higher torque capacity of the double enveloping worm and worm gear, fewer pairs of gearsets can be utilized than is typically desired in a standard worm differentials. For example, the standard worm differential typically uses three element gear pairs disposed at 120 degree intervals around the worm gears in order to provide the desired torque capacity. However, due to the increased torque capacity of the double enveloping worm and worm gear according to the present invention, two pairs of gear elements may be utilized without a corresponding reduction in torque capacity but providing a substantial weight reduction.

The present invention also discloses that the enveloping worms utilized with the worm differential according to the present invention can be split worms, thereby further contributing to a reduction in the weight and size requirements of the differential. Furthermore, the present invention also enables heavy duty worm differentials to be made with little or no weight increase in comparison with conventional worm differentials.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
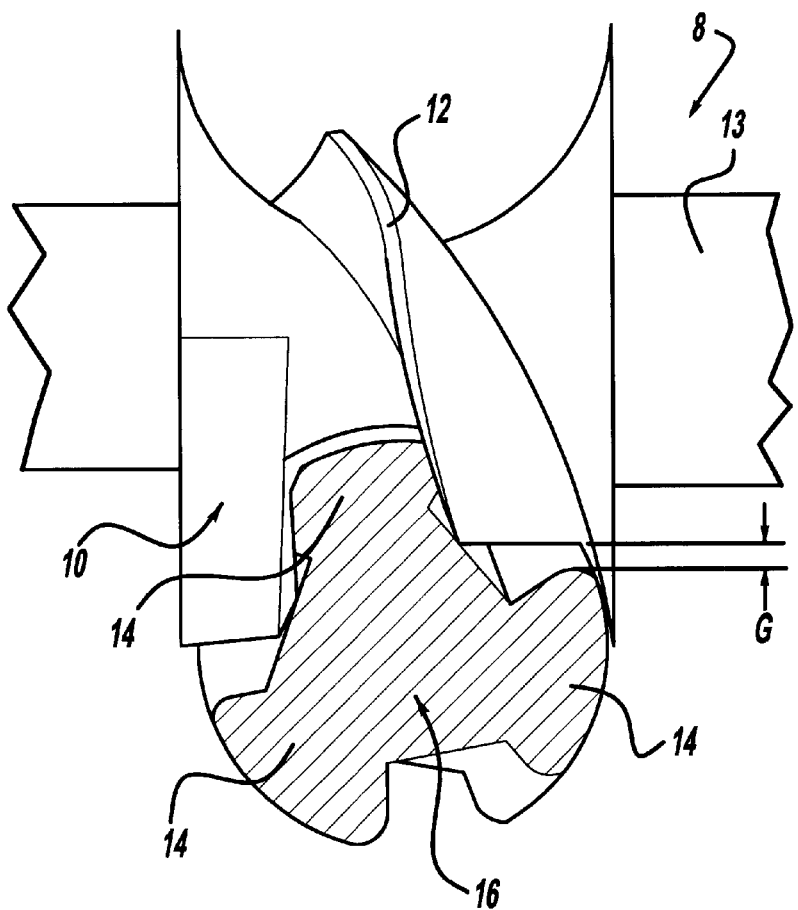
FIG. 1 is a sectional view of a worm/worm gear transmission with the worm gear having three teeth according to the principles of the present invention.

As will be detailed, various differential units with worm gearsets employing the principles of the present invention will be described below with reference to FIGS. 24–27. Initially, however, the following discussion relates to FIGS. 1–23 which provide a detailed description of the unique worm/worm gear transmissions associated with the present invention. In particular, unique enveloping-type transmissions comprised of an enveloping worm gear and an enveloping worm will be detailed. According to the principles of the present invention, the minimum ratio between the number of teeth on the worm gear and one thread on the worm is two. Accordingly, by rotation of the worm gear, the worm rotates with higher speed.

The reason for using an enveloping-type of worm gear is that this type of worm gear has a natural tooth surface profile which is distinct from other types of thread followers. The configuration of the worm gear teeth is generated by the profile of the thread or threads of the worm. A computer model simulation can be utilized to generate the configuration of the worm gear teeth of the worm gear. The worm gears can then be formed using known techniques such as hobbing or casting. When the worm gear teeth are generated from the profile of worm threads having different lengths for the same enveloping angle (shortened), the profiles of the worm teeth are different. The main advantage for using the enveloping-type of worm gears is more torque capacity.

The worm thread has a rolling action contact relationship with the teeth of the worm gear which provides an increased efficiency. Furthermore, it is beneficial to have the pitch diameter in the center portion of the worm on the same order as the pitch diameter in the center of the worm gear. With standard worm designs, with more than one thread and a large enveloping angle, the inability to assembly the worm and worm gear was considered a major obstacle. With the worm and worm gear of the present invention, the worm and worm gear are easily assembled by properly orienting the worm thread and worm teeth.

According to the present invention, the greater enveloping angle for one revolution of the worm thread permits the use of worm gear teeth without undercut portions. Enveloping worm/worm gear transmissions with a worm gear having less than twenty-four teeth have not been commercially used because it was believed impossible to build such a transmission due to the need to undercut the root of the worm gear tooth. Thus, those skilled in the art did not consider enveloping type worm gears with less than twenty-four teeth to be feasible for commercial applications. In contrast, the enveloping worm/worm gear transmission of the present invention utilize a worm gear without undercut gear teeth because of a greater enveloping angle for one revolution of the worm thread.

With less than twenty-four gear teeth and a greater enveloping angle for one revolution of the thread, as compared to prior enveloping worm/worm gear transmissions, the minimum ratio for one thread could be reduced to two, with an increase in achieved efficiency, in contrast, prior enveloping worm/worm gear transmissions had a minimum ratio of twenty-four for one thread of the worm and a ratio of five for five threads of the worm. The efficiency of the new worm/worm gear transmission is even greater than that of well-known hypoid gearsets which are used in low ratio right-angle drives. Thus, the present invention can replace hypoid or bevel gearing in many applications by reason of the low ratio. In addition, this new worm/worm gear transmission is able to back drive by transmitting torque from the worm gear to the worm. For the same size, this invention has more than twice the capacity of traditional hypoid gearing.

In this application, it is possible to have "surface to surface" contact between the worm gear teeth and the worm thread, thereby increasing the torque capacity of the enveloping worm/worm gear transmission. This became feasible when the enveloping angle for one revolution of worm thread is equal or greater than 15 degrees. In all standard enveloping worm/worm gear transmissions, only "line" contact is obtained between the thread and worm gear teeth or thread followers. This physical distinction has realized new and unexpected results with regard to the torque capacity of the worm/worm gear transmission of the present invention. The efficiency of the new worm/worm gear transmission is equal or even greater than in well-known hypoid gearing, which are used in right angle drives with low ratio. For back drive, when the worm gear is a driven member and the worm is a driving member, this worm/worm gear transmission also has high efficiency compared to a hypoid gear set.

In accordance with one feature of the present invention, a worm/worm gear transmission is utilized to transmit rotation with the smallest ratio between the worm gear teeth and one worm thread. In the past, it has been believed that at least 24 teeth were required for a worm gear to be used with a double enveloping worm/worm gear combination. However, in the present invention, the big difference from the traditional worm/worm gear is not only in the number of teeth, but also in the enveloping angle of the worm thread, which is used for generation of the profile for the worm gear teeth. This enveloping angle can be as large as 180 degrees for one revolution of the thread when the number of worm gear teeth is only two but is preferably larger than 15 degrees. Further detail of the use of the unique worm/worm gear transmission discussed herein can be found in U.S. Pat. No. 5,992,259 entitled "Worm/Worm Gear Transmission and Apparatus for Transmitting Rotation Utilizing An Oscillating Input" and U.S. application Ser. No. 09/290,911 filed Apr. 12, 1999 titled "Worm/Worm Gear Transmission," both of which are owned by the inventor hereof and which are also expressly incorporated by reference hereto.

Referring now to the drawings, one embodiment of a worm/worm gear transmission 8 of the present invention is illustrated in FIG. 1. Transmission 8 has an enveloping type worm 10 with at least one screw thread 12. Enveloping type worm 10 is supported on a shaft 13. Thread 12 is engaged by at least one tooth 14 of an enveloping type worm gear 16, which is shown to have three teeth 14. As shown in FIG. 1, enveloping worm 10 has a single thread 12 in a preferred embodiment and worm gear 16 has three teeth 14 spaced about its circumference. As shown, a gap "G" exists between any tooth on worm gear 16 and thread 12 on enveloping worm 10. Enveloping worm 10 wraps around enveloping worm gear 16, and enveloping worm gear 16 also wraps around enveloping worm 10.

Worm gear 16 and worm 10 are preferably enclosed in a housing (not shown) in FIG. 1. Typically, the housing is made from metal and forms a reservoir for a lubricant to both lubricate and cool the gears, bearings, and seals for the unit. The housing forms a rigid support to mount the gears, bearings, seals and their associated parts (not shown).

Figure 17:
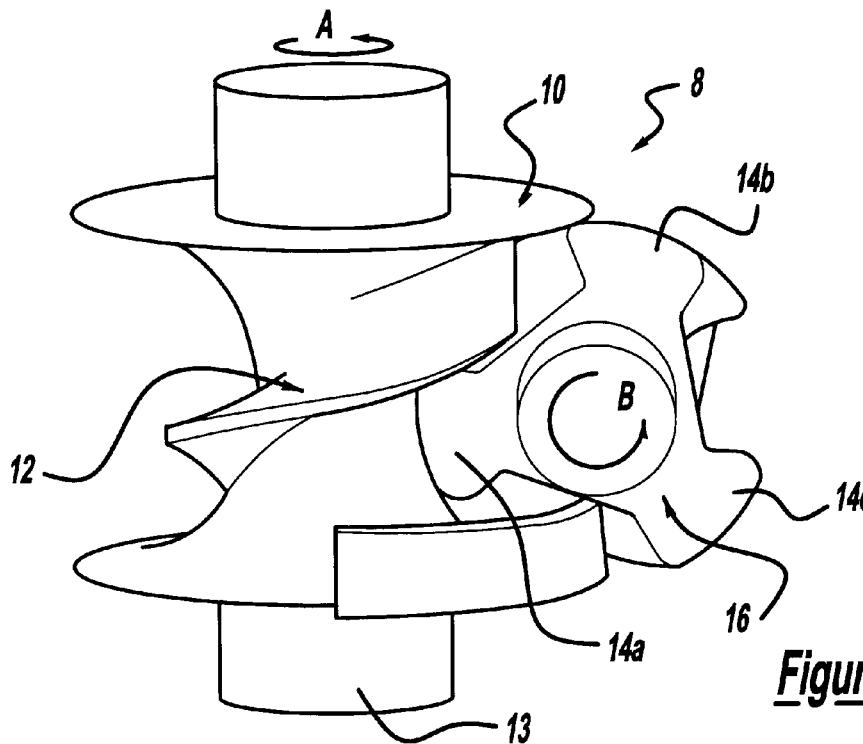
FIG. 17 is a perspective view of the worm/worm gear transmission shown in FIG. 1 with three worm gear teeth.

FIG. 17 is a perspective view corresponding with worm/worm gear transmission 8 shown in FIG. 1 and which includes an enveloping worm 10 having a single thread 12 and a worm gear 16 having three gear teeth 14. As can be understood, as worm 10 rotates in the direction of Arrow A, thread 12 which is engaged with tooth 14a presses downward on tooth 14a to cause rotation of worm gear 16 in the direction of Arrow "B". As worm gear 16 rotates, gear tooth 14b then comes into engagement with thread 12 and is acted on to cause further rotation of worm gear 16 as gear tooth 14a disengages from thread 12.

Figure 2:
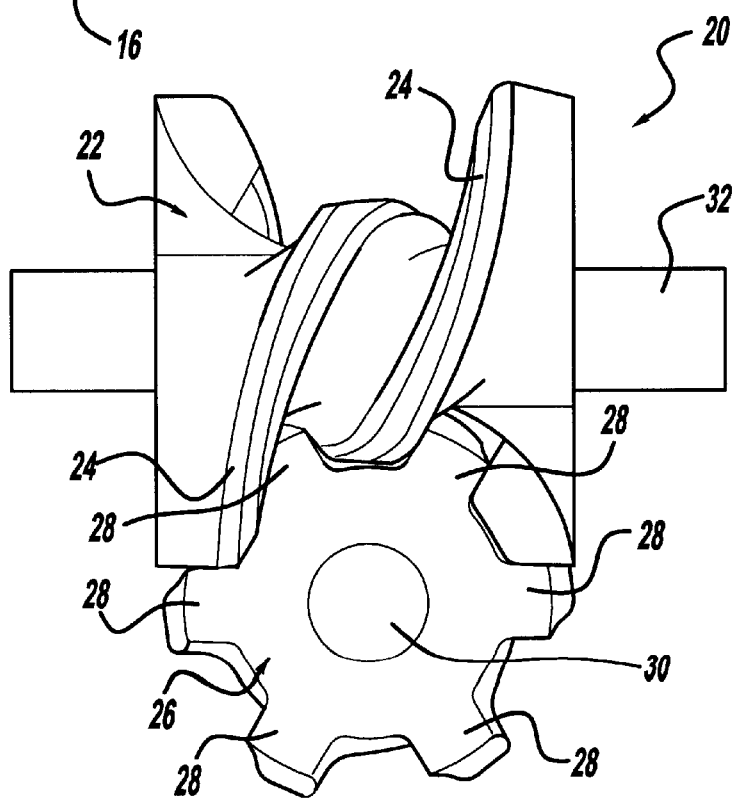
FIGS. 2 and 3 are views of a worm/worm gear transmission with the worm gear having six teeth according to the principles of the present invention.
Figure 3:
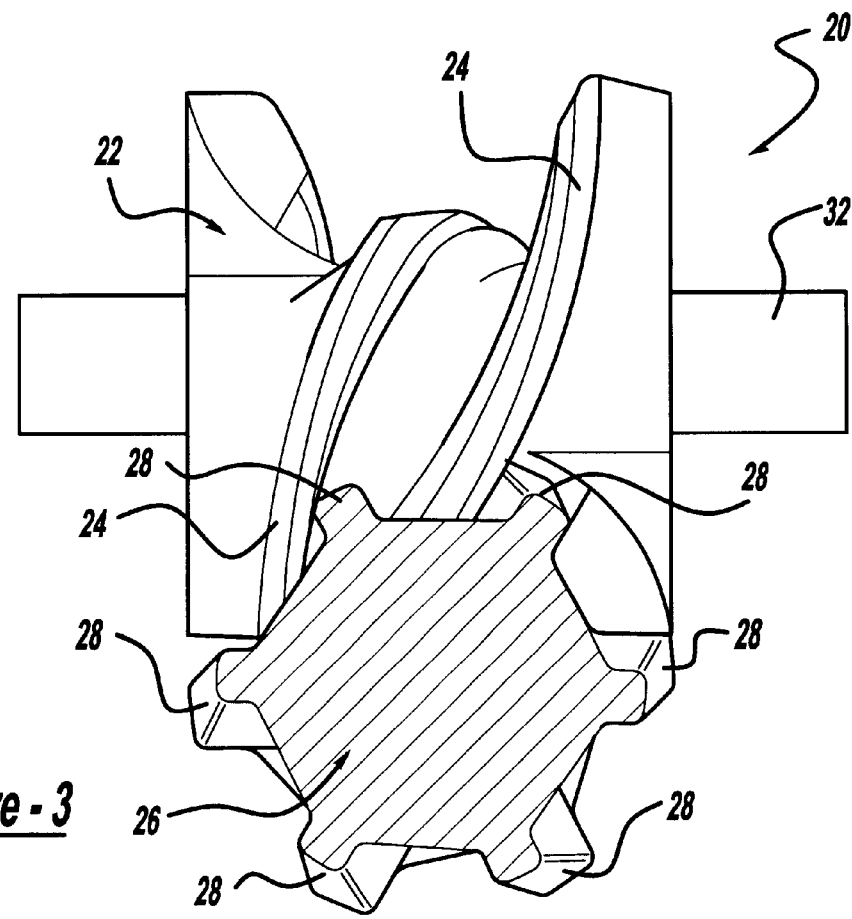
Figure 4:
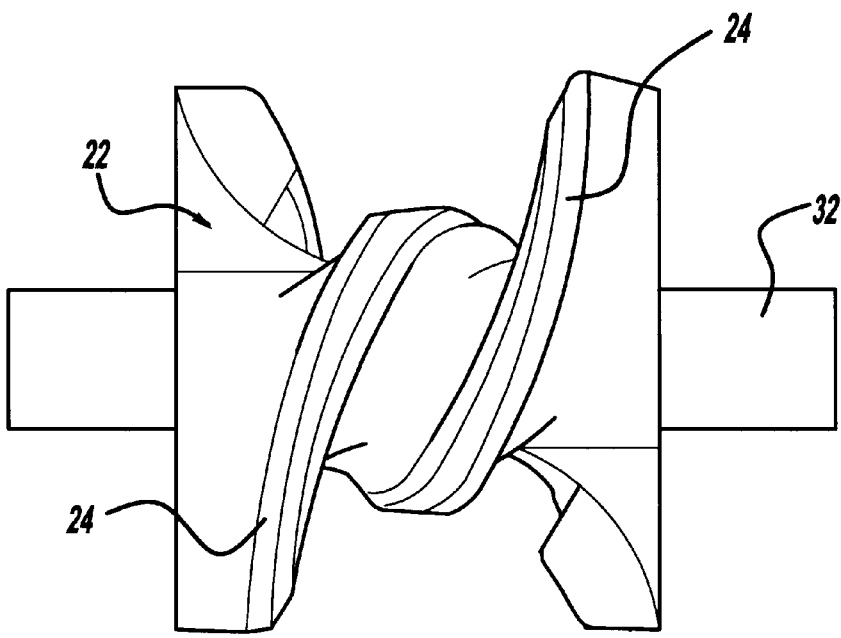
FIG. 4 is a side view of an enveloping worm having two threads.
Figure 18:
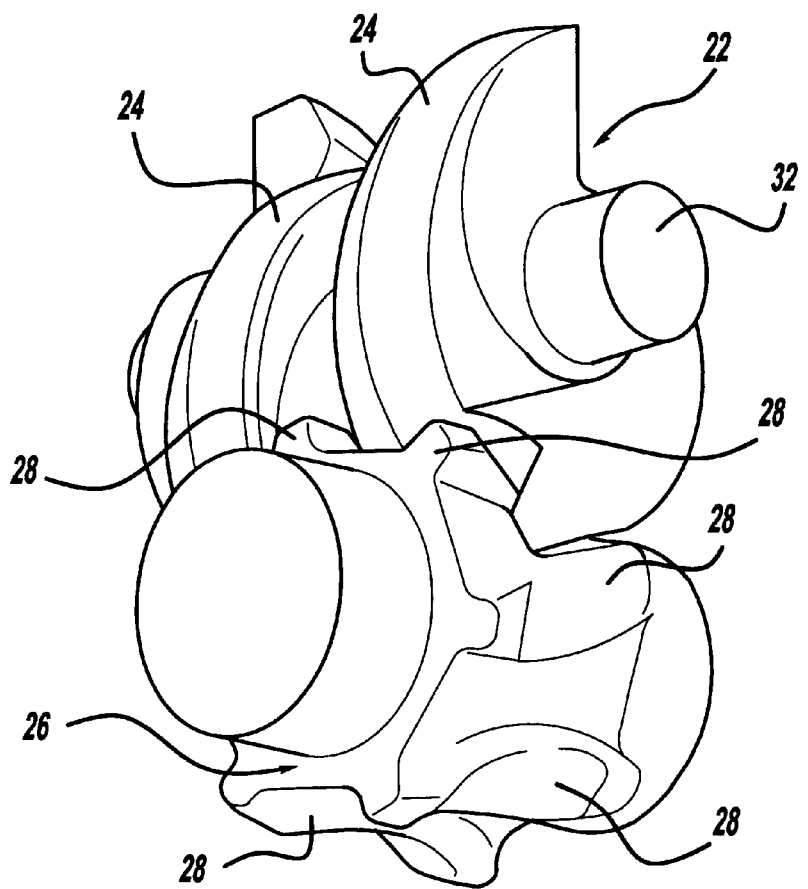
FIG. 18 is a perspective view of the worm/worm gear transmission shown in FIG. 2 with six worm gear teeth and two threads on the worm.

Another embodiment of a worm/worm gear transmission 20 of the present invention is illustrated in FIG. 2. This transmission has an enveloping-type worm 22 with two identical screw threads 24. Threads 24 are engaged by at least one tooth of an enveloping-type worm gear 26 shown to have six teeth 28. Worm gear 26 is connected to a shaft 30 while worm 22 is connected to a shaft 32. In FIG. 3, worm gear 26 is shown in cross-section. FIG. 4 is a side view of enveloping worm 22 with two identical threads 24 and supporting shaft 32. FIG. 18 is a perspective view corresponding with worm/worm gear transmission 20 shown in FIG. 2 and which includes enveloping worm gear 26 having six teeth 28 in mesh with enveloping worm 22 having two threads 24.

Figure 5:
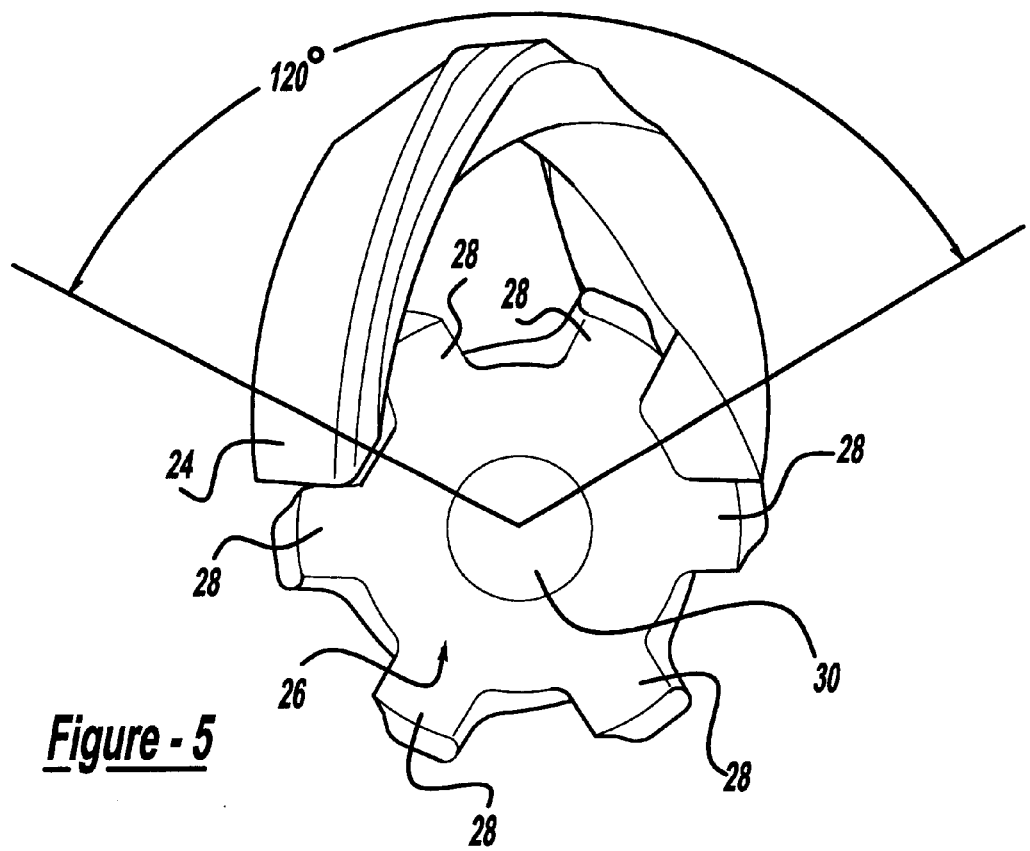
FIG. 5 illustrates an enveloping thread of a worm used for generating the gear teeth profile of the worm gear.

FIG. 5 shows an enveloping angle of 120° for enveloping worm thread 24 that is used to generate the six teeth 28 on worm gear 26. This enveloping worm thread 24 has one revolution of thread or 360° of revolution around its axis of rotation. For illustration of one revolution for the enveloping worm thread, we could use this example: the ends of worm threads have the same cross-sections but could be placed from one position to another position, which is a distinct 120°. This is possible by movement of the cross-section of the worm from one end along the worm thread 24 to another end. In this case, the cross-section will rotate 360° around the axis of rotation for shaft 32.

Figure 21:
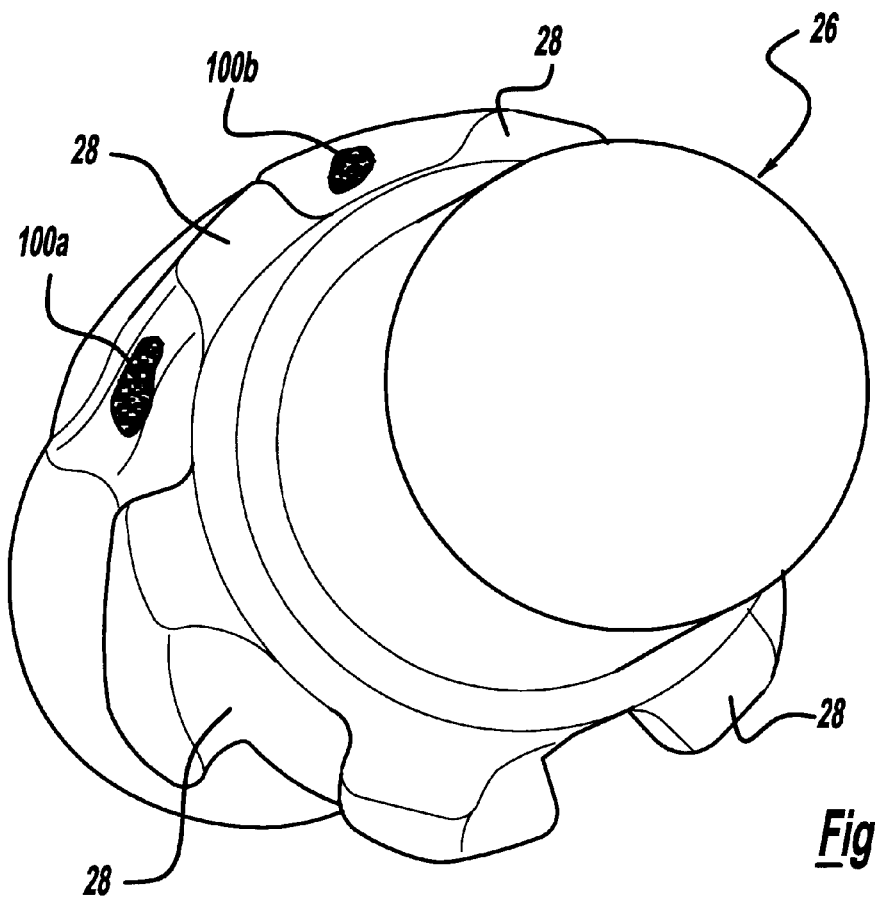
FIG. 21 is a perspective view of a worm gear with six teeth with darkened spots illustrated on the surface of the teeth to indicate the contact surface with the worm in mesh.
Figure 22:
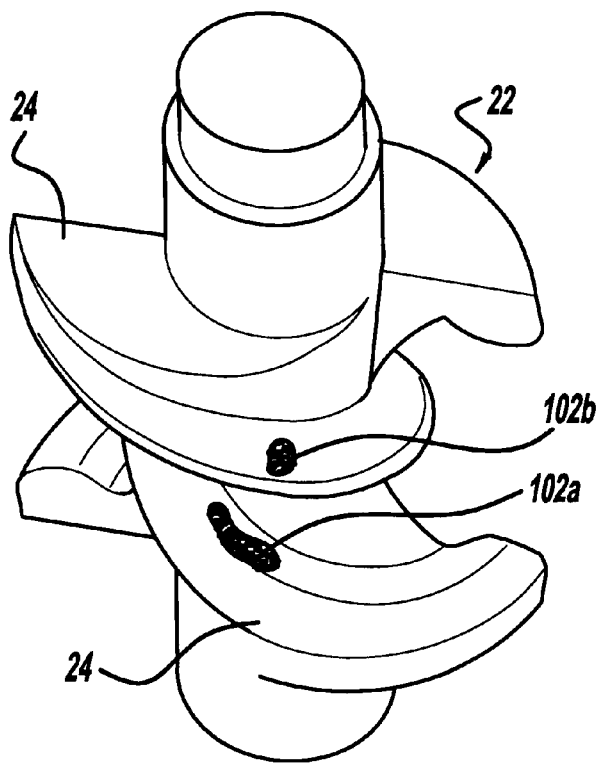
FIG. 22 is a perspective view of a worm with two threads with darkened spots illustrated on the surface of the thread to indicate the contact surface with the worm gear in mesh.

The enveloping worm/worm gear transmissions of the present invention provide for a worm gear having fewer than twenty-four teeth and also provides surface contact between the thread of the worm and the teeth of the worm gear as illustrated in FIGS. 21 and 22. FIG. 21 illustrates two surface contact spots 100a, 100b for a worm gear 26 having six teeth 28. FIG. 22 illustrates two corresponding surface contact spots 102a, 102b for a worm 22 with two threads 24.

Figure 6:
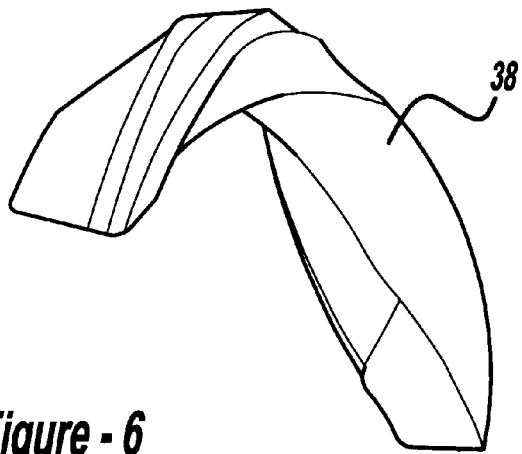
FIG. 6 is a view of a shortened thread of a worm used for generating the gear teeth profile of the worm gear.

FIG. 6 shows a worm thread 38 used for generating worm gear teeth and which is a shortened portion of a thread having an enveloping angle of 120°.

Figure 7:
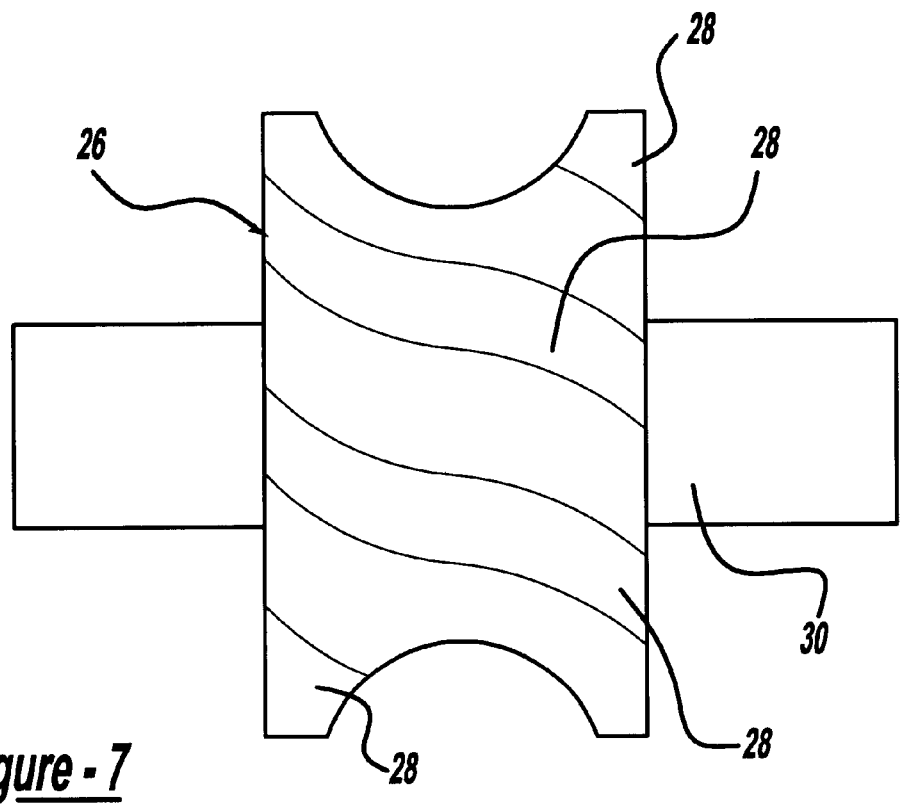
FIG. 7 shows an enveloping worm gear according to the principles of the present invention.
Figure 8:
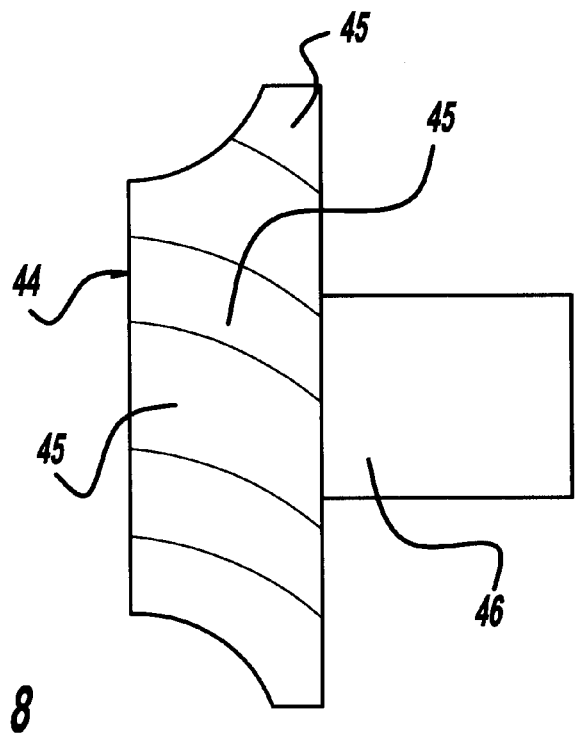
FIG. 8 shows a modified enveloping worm gear.

FIG. 7 shows a side view of enveloping worm gear 26 with six teeth 28. FIG. 8 shows an enveloping worm gear 44 having six teeth 34 which is modified from worm gear 26 shown in FIG. 7 by shortening the gear along its axis of rotation around a shaft 46. Practically, worm gear 44 could be longitudinally split into two halves and using only one shortened part or generated worm gear from blank, which is already shortened. Modified worm gear 44 is easy to assemble in a single reduction unit. This is very important for gears with a small pressure angle when it is difficult to assemble an enveloping worm with an enveloping type of worm gear. For many applications, only the modified worm gear 44 may be adequate. Enveloping worm gear 44 could connect to drive shaft 46 for supporting worm gear 44 from only one side or could be supported on both sides.

The bodies of enveloping worm gears 26 and 44 have axially extending end flanges that hook underneath flanges of adjacent collars to hold the worms in place. One or both of the worm and worm gear bodies are keyed or otherwise fastened to the shaft for driving or being driven. Relatively slight longitudinal movement of one or both the worm or worm gear allows for disassembling the entire worm gear—collars—shaft assembly.

In the present invention, it is preferred that the ratio of the number of teeth 14 on worm gear 16 relative to the number of threads 12 on worm 10 is 11 to 1 and less. Most preferably, the ratio is three or even less, as shown. It is possible that only two teeth 14 need to be utilized on worm gear 16. The worm/worm gear transmission used in the present application could also self lock. The term "self-locking" as it is utilized in this application to describe the inventive worm and worm gear combinations, means that the teeth of the worm gear, when in contact with the thread of the worm, are not capable of rotating the worm about the axis of the worm. For example, teeth 14 do not slip on thread 12, thereby causing thread 12 to rotate about its own axis. By carefully selecting the material of teeth 14 and threads 12, and the respective angles, a worker of ordinary skill in the art would be able to achieve this goal. The worm/worm gear transmission of the present invention particularly lends itself to a geometric as opposed to a purely frictional type self-locking device.

Figure 9:
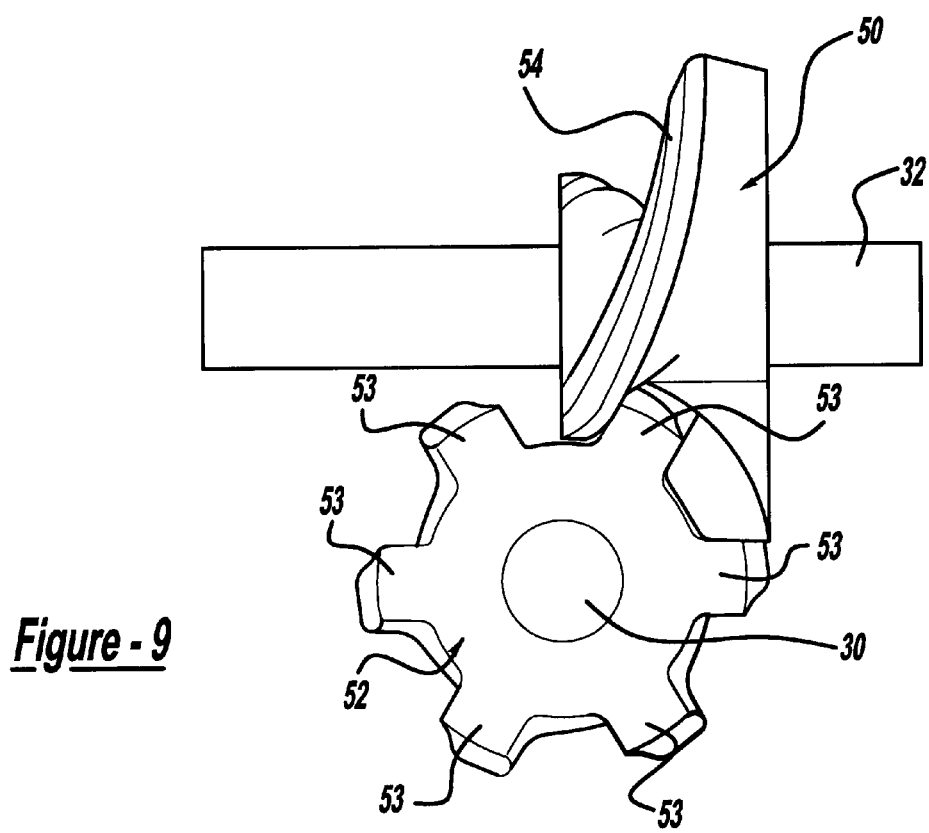
FIGS. 9 and 10 show a worm/worm gear transmission utilizing a modified worm.

FIG. 9 shows a shortened enveloping worm 50 with an enveloping type of worm gear 52, which has a different profile of teeth 53, compared to teeth 28 of worm gear 26 (shown in FIGS. 2 and 7) even for the same number of worm gear teeth. This difference is due to the fact that the profile of teeth 53 was generated by a shortened enveloping thread 54 for shortened enveloping worm 50.

Figure 10:
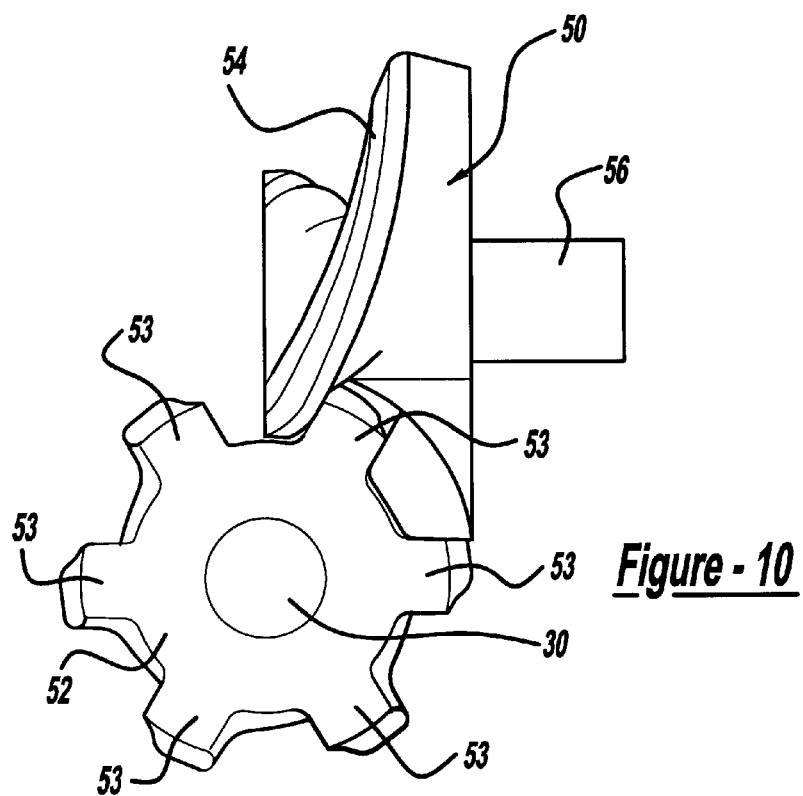
Figure 11:
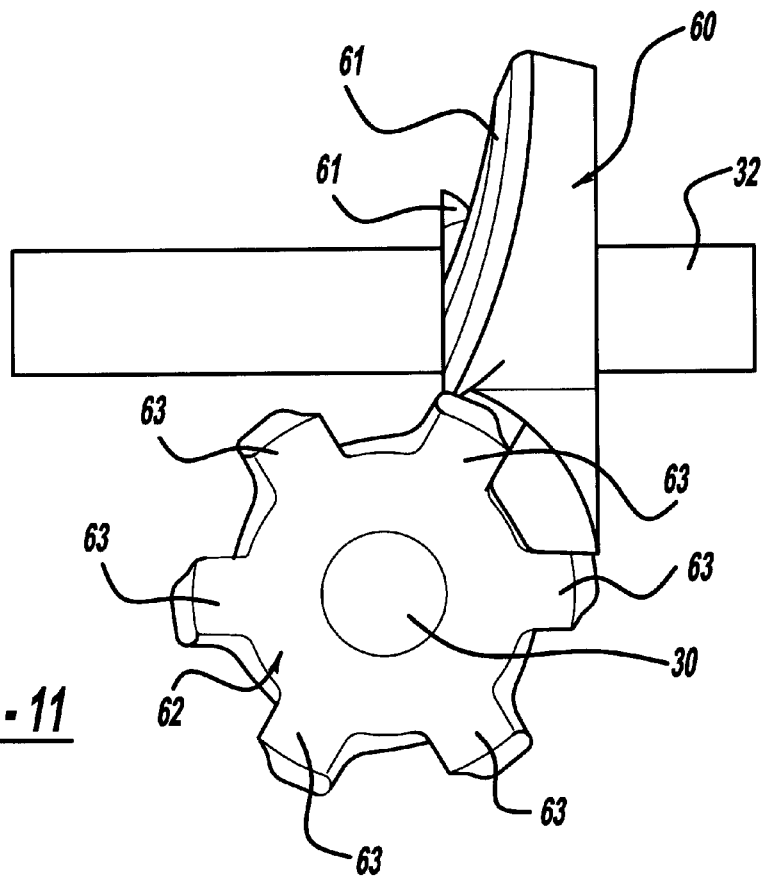
FIG. 11 shows a worm/worm gear transmission with a modified worm in an off-center position.
Figure 12:
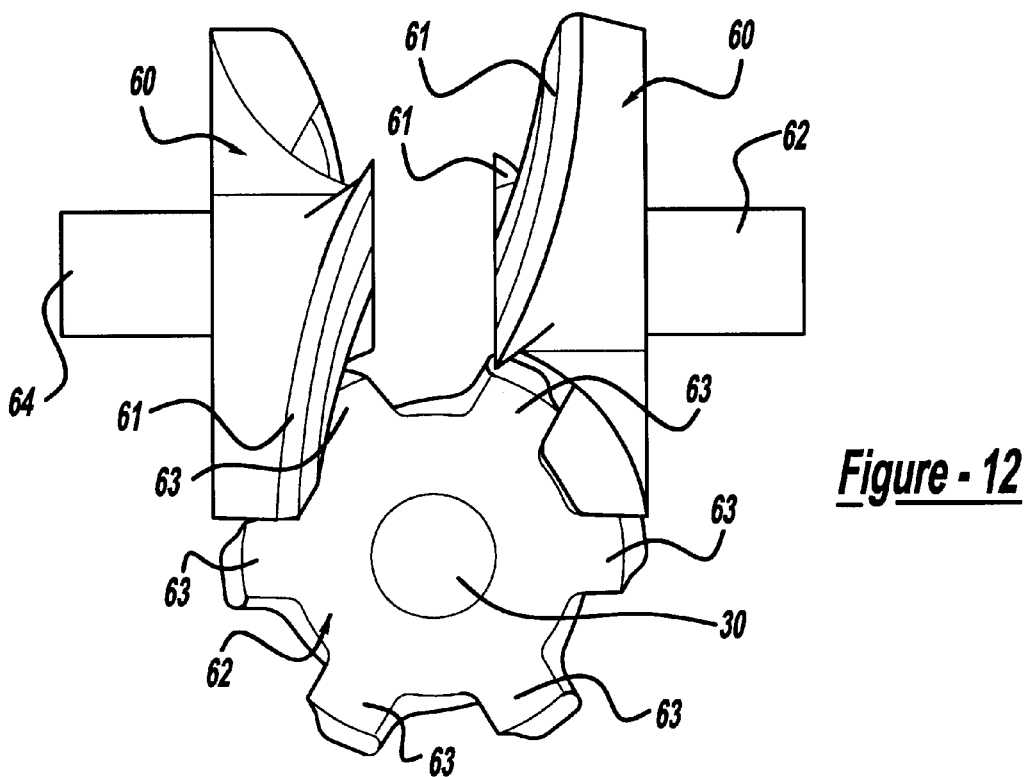
FIG. 12 shows a worm/worm gear transmission with two modified worms in off-center positions.

In FIG. 10, enveloping worm 50 is connected to a drive shaft 56 which supports worm 50 from one side. FIG. 11 shows a view of a worm/worm gear transmission with a modified enveloping split worm 60 having two threads 61 in an off-center position relative to an enveloping-type worm gear 62 having six teeth 63. In contrast, FIG. 12 shows a side view of a worm/worm gear transmission with two modified worms 60 having two threads 61 in off-center positions and respectively connected to different drive shafts 62 and 64 and each meshingly engaged with worm gear 62.

Figure 13:
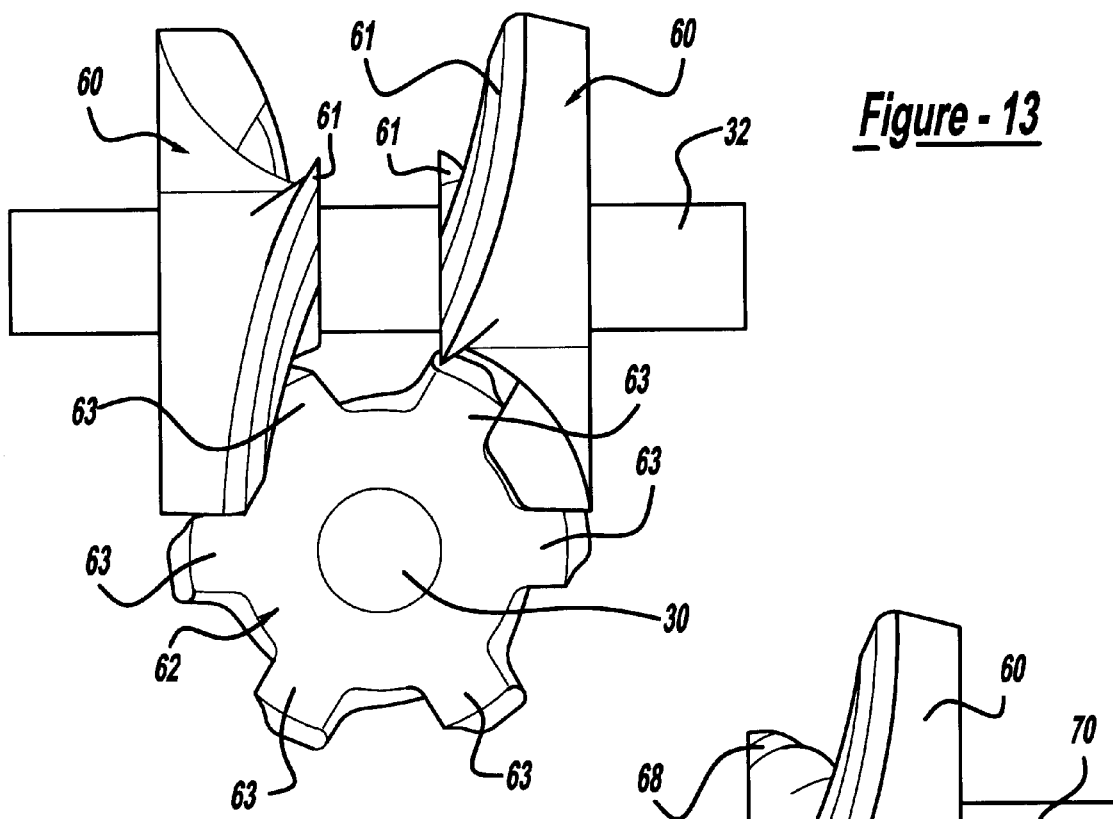
FIG. 13 shows a worm/worm gear transmission with two modified worms aligned on the same axis of rotation and connected to a common shaft.

FIG. 13 shows a view of a worm/worm gear transmission with two modified worms 60 in off-center positions placed on the same axis of rotation and both connected to drive shaft 32. When the modified worms are connected to a common shaft with a different angular phase of the threads, it means that in motion, the threads of one worm are entering mesh with the worm gear teeth while the thread of the other worm are released from mesh at different times. The purpose of the phase difference is to increase the contact ratio and to provide smooth mesh.

Figure 14:
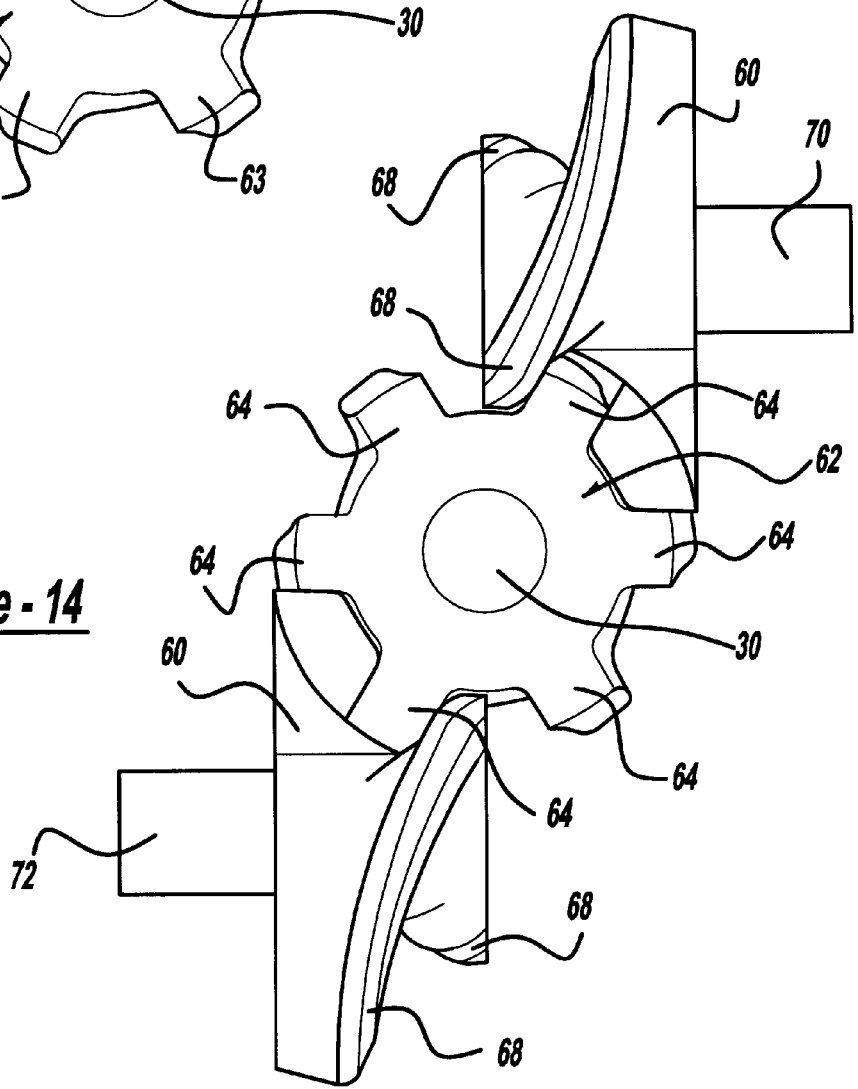
FIG. 14 shows a worm/worm gear transmission with two modified worms located on different axes of rotation.

FIG. 14 shows a view of a worm/worm gear transmission with two modified worms 60 having worm threads 68 each placed on different axes of rotation and connected to different drive shafts 70 and 72. Each of worms 60 meshingly engages the worm gear 62 having teeth 64.

Figure 15:
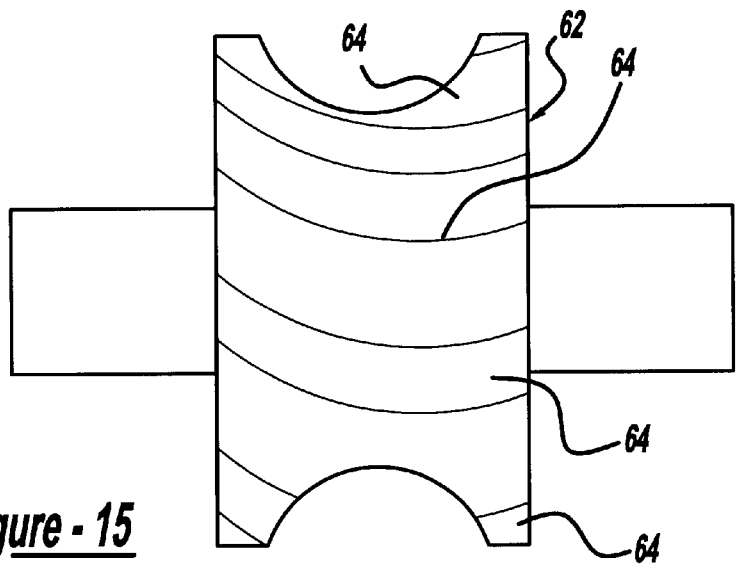
FIG. 15 shows an enveloping worm gear with a different tooth profile.

FIG. 15 shows a side view of an enveloping worm gear 62 with teeth 64 have a different profile which is generated by enveloping thread 68 of worm 60 as shown in FIG. 14.

Figure 16:
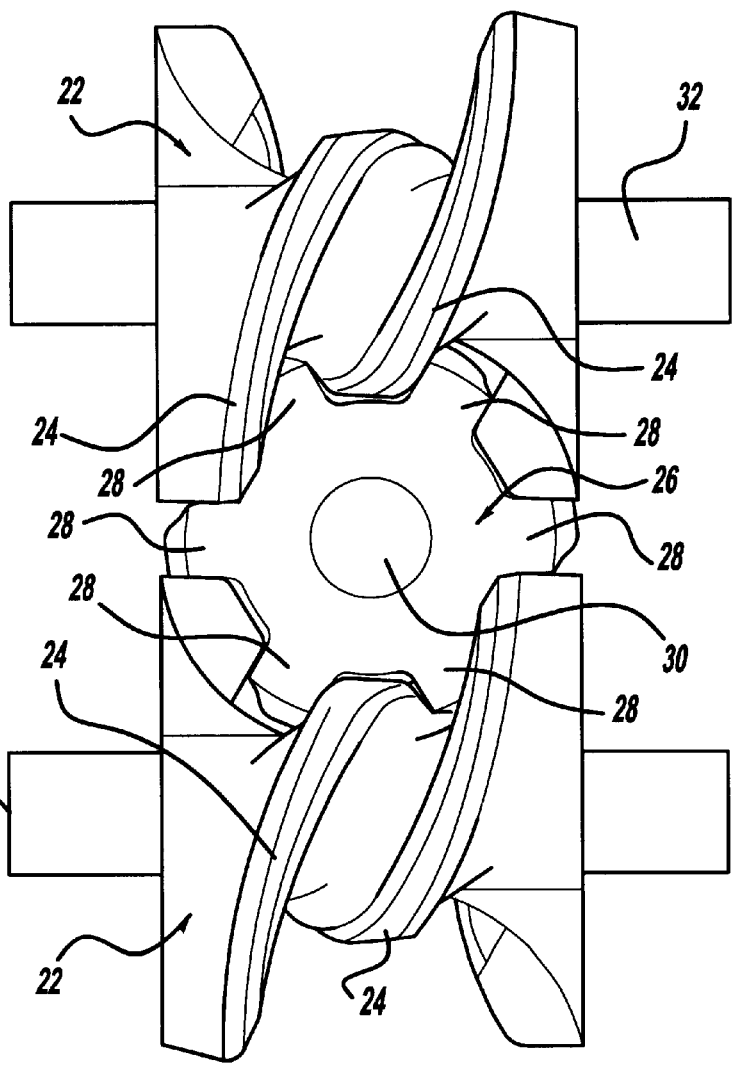
FIG. 16 shows a worm/worm gear transmission with two enveloping worms placed on different axes of rotation.

FIG. 16 shows a view of a worm/worm gear transmission with two enveloping worms 22 having corresponding worm threads 24 placed on different axes of rotation and which are connected to drive shafts 32 and 23. Each of worms 22 meshingly engages enveloping worm gear 26.

Figure 19:
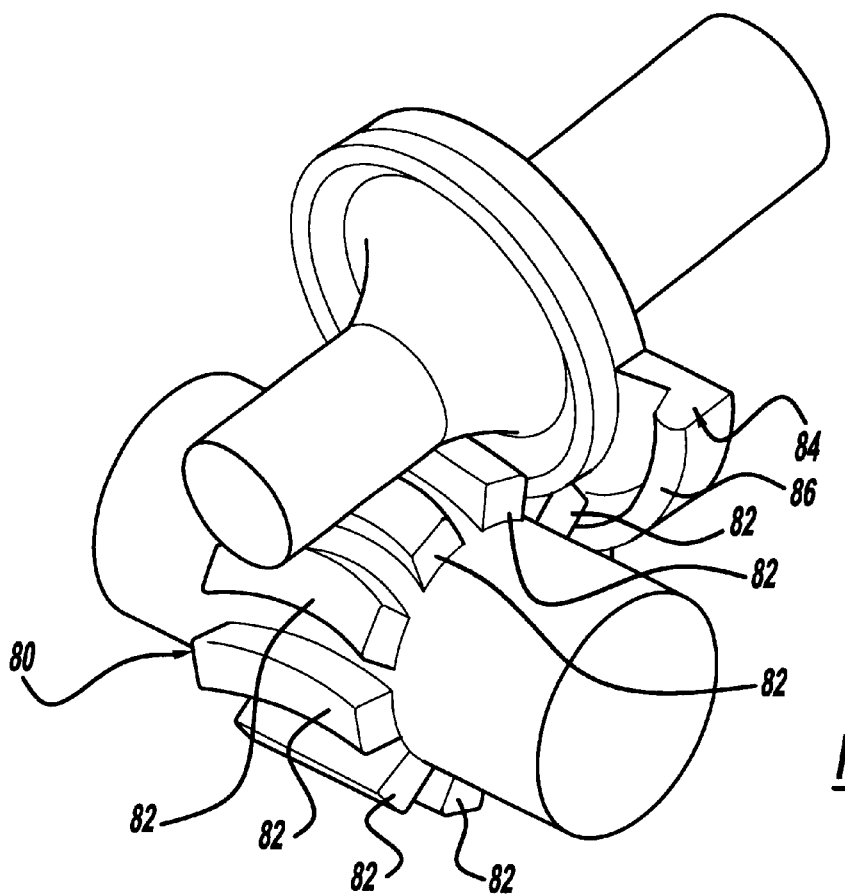
FIG. 19 is a perspective view of a worm/worm gear transmission with ten worm gear teeth and with a single thread worm.

FIG. 19 is a perspective view of a worm/worm gear transmission including worm gear 80 having ten teeth 82 in mesh with an enveloping split worm 84 including a thread 86.

Figure 20:
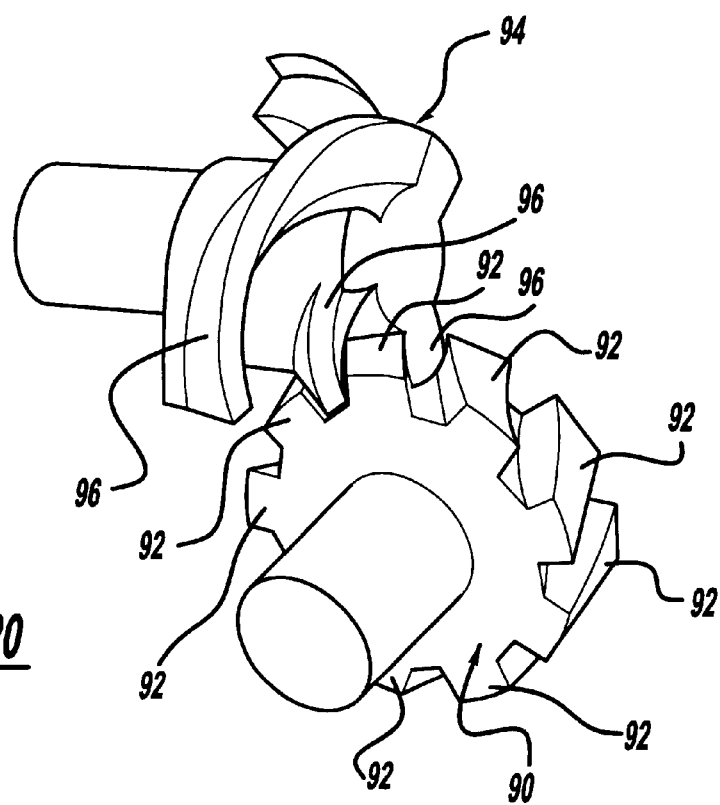
FIG. 20 is a perspective view of a worm/worm gear transmission with nine worm gear teeth and a modified worm having three threads on the worm.

FIG. 20 is a perspective view of a worm gear 90 having nine teeth 92 in mesh with a modified enveloping split worm 94 having three threads 96.

Figure 23:
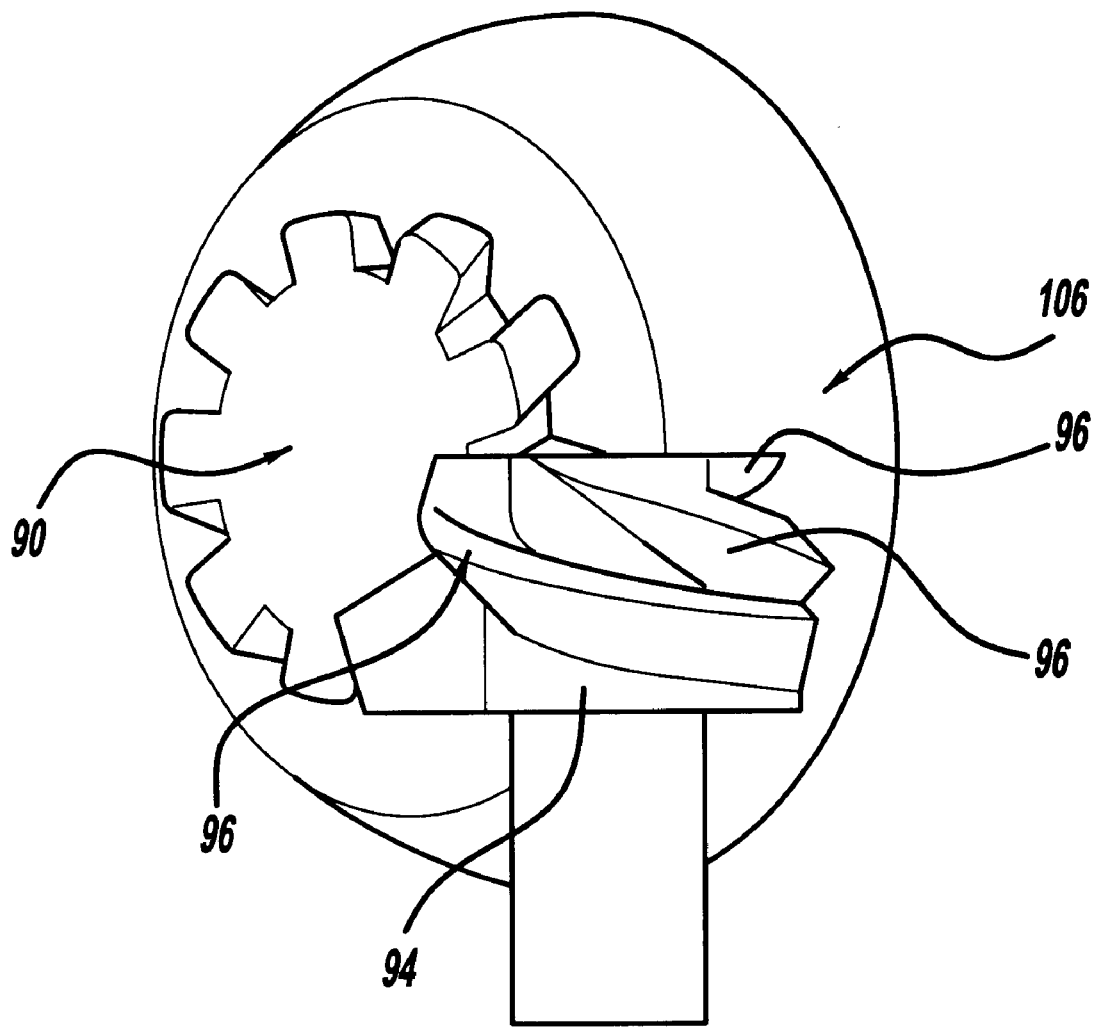
FIG. 23 illustrates the size difference of the worm/worm gear transmission of FIG. 20 in comparison to the size of a typical hypoid gear.

FIG. 23 illustrates the size difference of a worm/worm gear transmission as shown in FIG. 20 in comparison with the size of a typical hypoid gear 106.

For the inventions described in the present patent application, there could be two different types of operations. When the worm/worm gear transmission does not incorporate the self-lock feature, the motion could be provided from the drive shaft through enveloping worm 12 and enveloping-type worm gear 16 to an output shaft or back from the output shaft to the drive shaft 32. The same operation is applicable for motion from the drive shaft to the driven shafts or from the driven shafts to drive shaft of the various other embodiments shown. Alternatively, when the worm/worm gear transmission does include the self-lock feature, rotary motion can be provided only from the drive shaft to the enveloping worm and through the enveloping type worm gear to the output shaft. Thus, the worm/worm gear transmissions shown in FIGS. 12, 14 and 16, with independent drive shafts connected to the worms, could be used in a split-power transmission to transmit energy from a high-speed engine to a rotor drive shaft.

In the present invention, a self-locking worm/worm gear combination can have a worm gear to worm thread ratio that is preferably 10 and less. Such a system is desirable so that each one of the worm and worm gear combinations described above can transmit very high torque loads when compared to prior systems.

In the past, the worm and worm gears have been formed of materials having low coefficients of friction; worm gears typically were made only from bronze. With the present invention however, the worm and worm gear can be made from a high strength material, such as steel. The preferable shape of the teeth and threads for the worm gear and the worm are shown in the drawings, but could be different. Even so, a worker of ordinary skill in the art would recognize that other shapes would come within the scope of this invention.

In the present application, it is surface-to-surface contact between the worm gear teeth and the worm thread that increases the torque capacity of the enveloping worm/worm gear transmission. This became possible when the enveloping angle of the worm thread for generation of the worm gear teeth is more than 15 degrees, or even 30 degrees. The efficiency of the new worm/worm gear transmission is equal or even greater than in well-known hypoid gearing, which are used in right angle drives with low ratio. For back drive, when the worm gear is a driven member and the worm is a driving member, this worm/worm gear transmission also has high efficiency compared to a hypoid gear set.

It was confirmed by dyno testing of a steel worm/worm gear transmission constructed according to the present invention that such transmissions can replace hypoid or bevel gearing in many applications. The lower noise of the worm/worm gear transmission compared with hypoid and bevel gear transmissions make using the worm/worm gear transmission of the present invention more beneficial, in particular, in helicopter or in motor vehicle powertrain applications. For the same size, this invention can provide more than twice the capacity of hypoid gearing, where the hypoid gear also has more than 24 teeth. The smaller number of teeth of the present invention than in a hypoid gear of the same circumference makes each tooth thicker and therefore stronger. In the illustration shown in FIG. 23, a modified worm 94 with three threads 96 is shown which has a shape and size similar to a pinion of a hypoid transmission. Assuming the modified worm 94 is the same size as the pinion of a hypoid gear set, the diameter of hypoid gear 106 is twice the diameter of worm gear 90. Up to now, those skilled in the art were of the opinion that an enveloping type worm gear with less than twenty-four teeth would not work and/or that it presented an insurmountable barrier to commercial applications.

Figure 24:
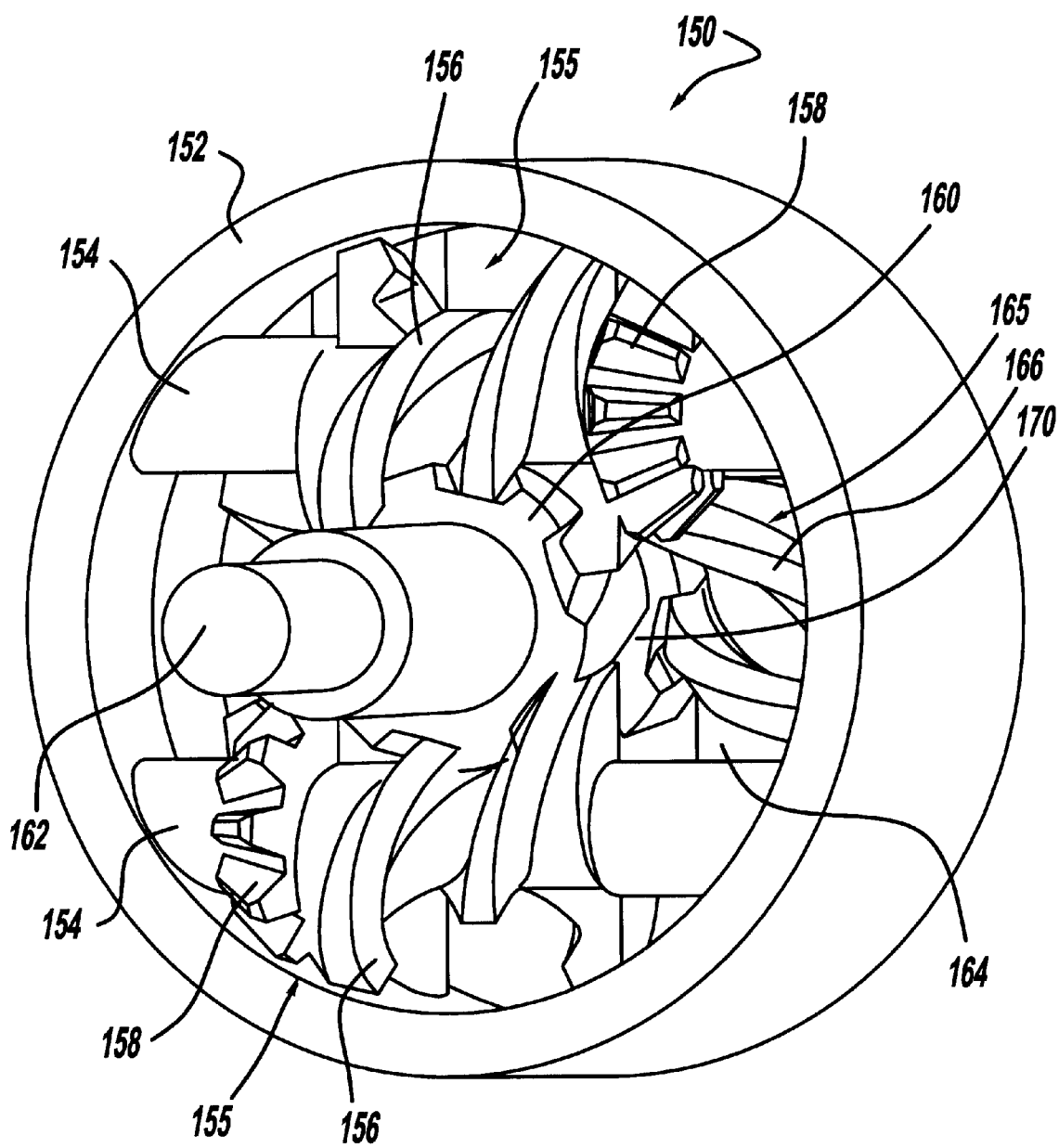
FIG. 24 is a perspective view of a differential unit with a double enveloping worm/worm gear transmission according to the principles of the present invention.

The double-enveloping worm/worm gear transmissions described above can be utilized in a worm-type differential unit, as will now be described with reference to FIGS. 24–27. Referring to FIG. 24, a worm gear differential unit 150 is shown to include a casing 152 which serves as an input member to differential unit 150. Casing 152 can be driven by a ring gear (not shown) mounted thereto, in a manner well known in the art. A first pair of pinion shafts 154 are rotatably supported by casing 152 and each is fixed to a compound gear 155. Each compound gear 155 includes an enveloping worm 156 and a bevel gear 158. Enveloping worms 156 each engage an enveloping worm gear 160 which serves as a first side gear and which is fixed to a first axle shaft 162. A second pair of pinion shafts 164 (one of which is shown) are rotatably supported by casing 152 and are aligned perpendicular to the first pair of pinion shafts 154. Each of the second pair of pinion shafts 164 is identical to pinion shafts 154 and has a compound gear 165 fixed thereto. Each compound gear 165 includes an enveloping worm 166 and a bevel gear (not shown). Enveloping worms 166 each meshingly engage a second enveloping worm gear 170 which serves as a second side gear and which is mounted to a second axle shaft (not shown) in the same manner as enveloping worm gear 160 is mounted to first axle shaft 162. Bevel gears 158 on the first pair of pinion shafts 154 each engage a respective bevel gear on the second pair of pinion shafts 164.

During operation, casing 152 of differential unit 150 is driven and as casing 152 rotates, if the axle shafts also rotate at the same speed, there is no relative rotation between side gears 160, 170 and the respective worms 156, 166 since no differential motion needs to be accommodated. However, during cornering of the vehicle, one of the axle shafts will rotate more rapidly than the other. In this instance, one of worm gears 160, 170 which is on the faster rotating side will drive the associated worm 156, 166, and transmit a reverse relative rotation via its bevel gears to the opposing pinion shaft on the slower rotary side. Thus, the worm on the slower side imparts a reverse relative rotation to the corresponding worm gear on the slower side in order to accommodate for the difference in rotational speed of the two axle shafts.

Figure 25:
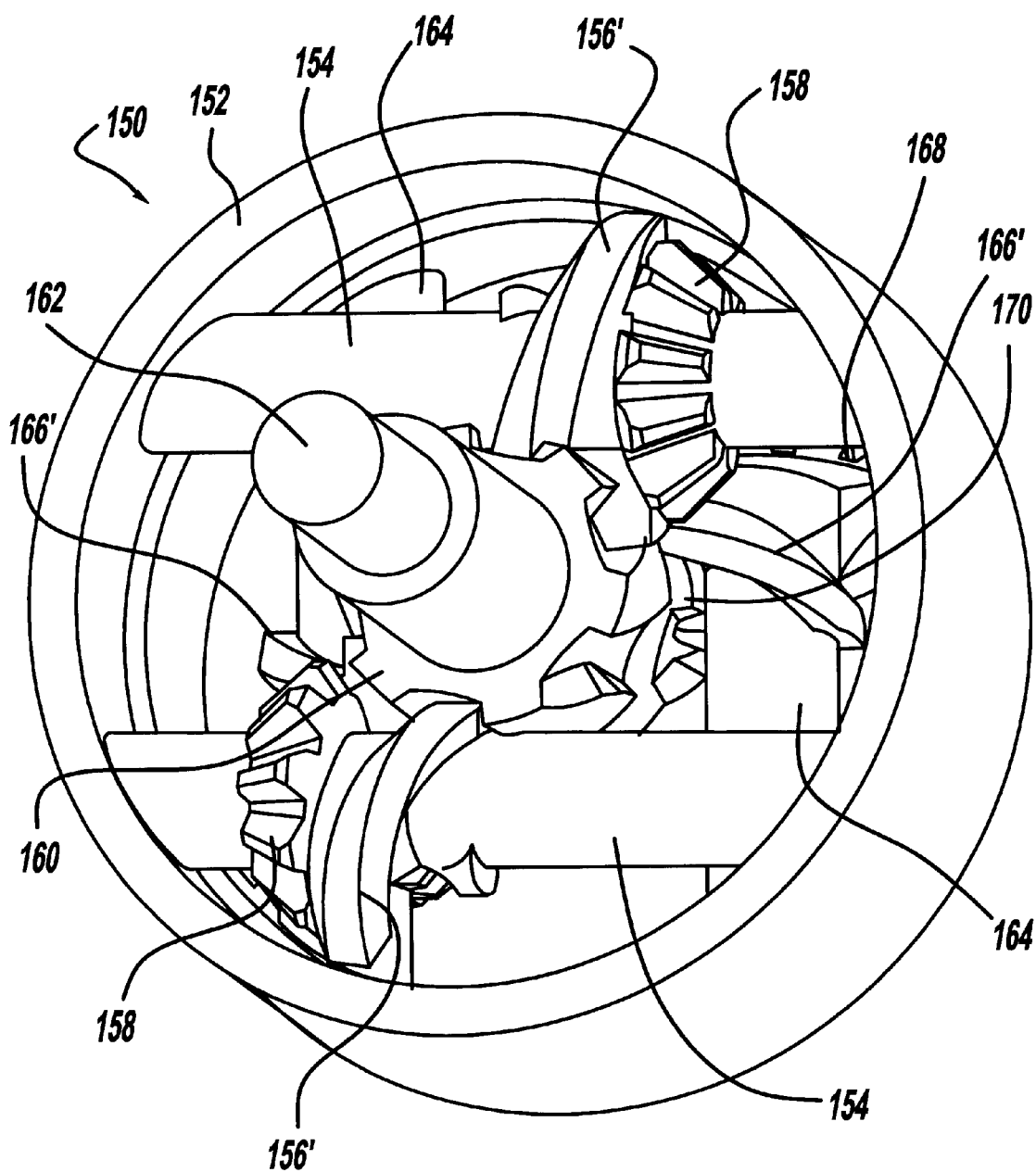
FIG. 25 is a second embodiment of a differential unit equipped with a double enveloping worm/worm gear transmission including a split worm.

With reference to FIG. 25, an alternative embodiment of the worm gear differential unit 150A of the present invention is shown wherein split enveloping worms 156' and 166' are utilized instead of the full enveloping worms 156 and 166 shown in FIG. 24. The use of split enveloping worms makes differential unit 150A easier to assemble since the worm and worm gear are more easily meshingly engaged. By reducing the worms to split worms, the weight of the differential can also be greatly reduced.

Figure 26:
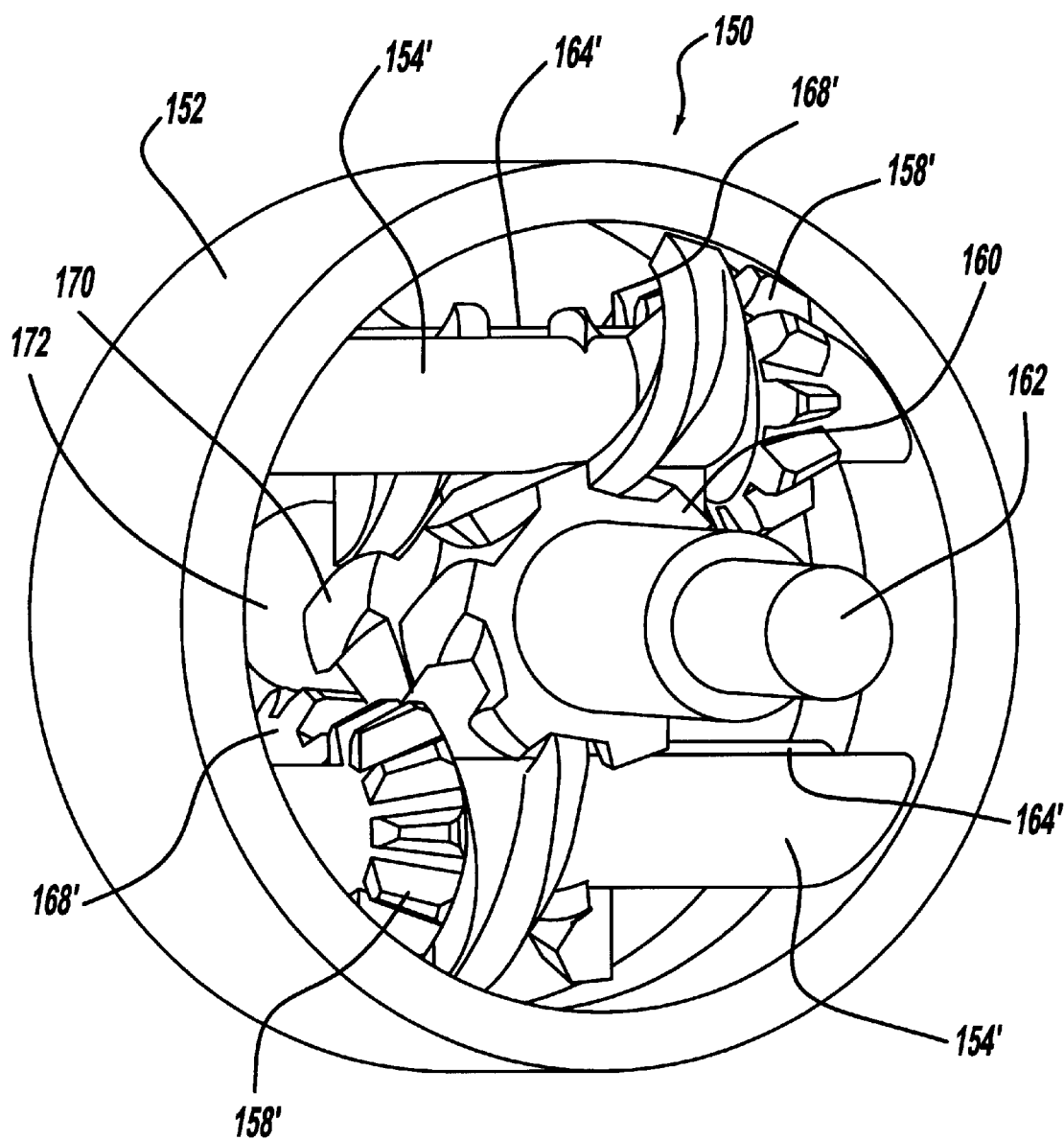
FIG. 26 is a perspective view of a differential unit according to the principles of the present invention with the gear element pairs of the worm/worm gear transmission disposed on parallel shafts and the enveloping worm being a split worm.

With reference to FIG. 26, a third embodiment of a worm gear differential unit 150B of the present invention is shown to illustrate that the first set of pinion shafts 154' and the second set of pinion shafts 164' can be disposed in parallel to one another and provided with spur gears 158' and 168' instead of bevel gears 158 and 168. Spur gears 158' on the first set of pinion shafts 154' engage with corresponding spur gears 168' of the second set of pinion shafts 164'.

Figure 27:
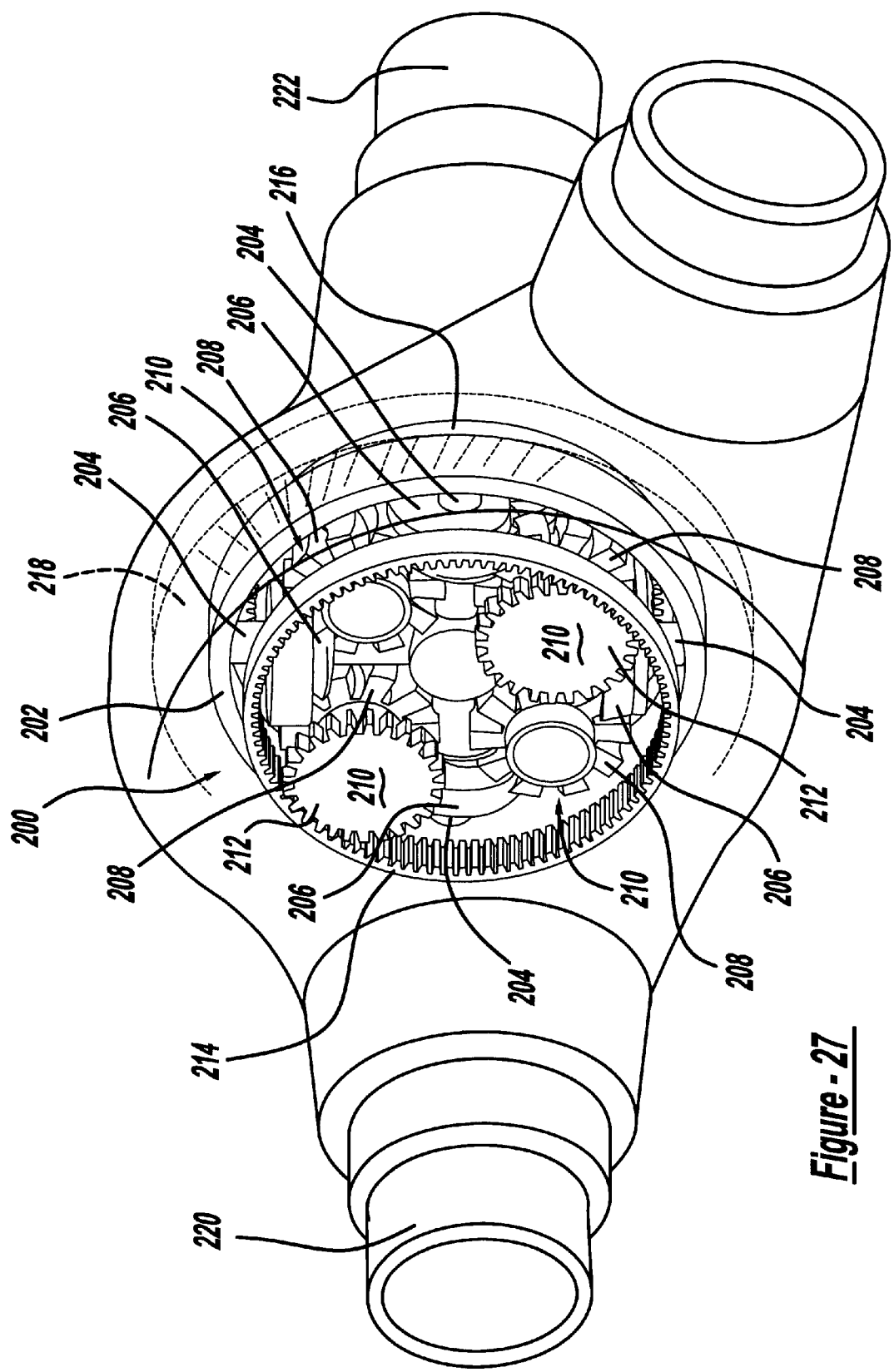
FIG. 27 is a perspective view of a worm differential gear mechanisms according to yet another embodiment of the present invention.

With reference to FIG. 27, a fourth embodiment of the worm gear differential unit of the present invention will be described. Worm gear differential unit 200 includes a casing 202 (partially shown) which supports a plurality of pinion pins 204 which each rotatably support an enveloping worm 206. Enveloping worms 206 each matingly engage a corresponding enveloping worm gear portion 208 of a compound gear element 210 which also includes a spur gear 212. Compound gear elements 210 are supported by casing 202. A spur gear 212 of compound gears 210 meshingly engages with an annular gear portion of a left hand axle shaft output member 214 while a spur gear portion 212 of the other compound gear engages a right hand axle output shaft member 216. During normal operation, casing 202 of differential assembly 200 is driven by a ring gear 218 or other drive means (in a manner known in the art) and worm and worm gears 206 and 208 have no relative rotation therebetween. During cornering of the vehicle, one of axle shafts 220 and 222 rotates faster than the other. In this instance, compound gears 210 having spur gears 212 engaged with annular gear portion 214, 216 of the faster moving axle shaft 220, 222 are rotated relative to their respective axis of rotation and transmit a rotation via worm gear portion 208 thereof to worms 206. Worms 206 thereby transmit a corresponding reverse relative rotation to compound gears 210 having spur gears 212 which mate with annular gear portion 214, 216 of slower moving axle shaft 220, 222 in order to accommodate for the difference in speed of two axle shaft output members 214, 216.

The double-enveloping worm/worm gear transmission utilized in the above-described worm differential gear mechanism preferably have a ratio of the number of gear teeth relative to the number of threads on the worm that is low. Preferably, the number of gear teeth on the worm gear is less than 24.

Several embodiments of the present invention have been disclosed. A worker of ordinary skill in the art would recognize that certain modifications would come within the scope of this invention. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A worm differential, comprising:

a differential case;

first and second axle shafts rotatably supported by said differential case;

a first enveloping worm gear mounted to said first axle shaft and a second enveloping worm gear mounted to said second axle shaft;

a first compound gear rotatably supported by said differential case and having a first enveloping worm and a first gear, said first enveloping worm being meshed with said first enveloping worm gear; and a second compound gear rotatably supported by said differential case and having a second enveloping worm meshed with said second enveloping worm gear and a second gear meshed with said first gear; and further comprising a pair of said first compound gears and a pair of said second compound gears, said first compound gears being aligned perpendicular to said second compound gears.

2. The worm differential of claim 1 wherein said first enveloping worm gear having a number of gear teeth less than twenty four, and wherein said first enveloping worm having a screw-thread engaging said gear teeth of said first enveloping worm gear.

3. A worm differential, comprising:

a differential case;

first and second axle shafts rotatably supported by said differential case;

a first enveloping worm gear mounted to said first axle shaft and a second enveloping worm gear mounted to said second axle shaft;

a first compound gear rotatably supported by said differential case and having a first enveloping worm and a first gear, said first enveloping worm being meshed with said first enveloping worm gear; and a second compound gear rotatably supported by said differential case and having a second enveloping worm meshed with said second enveloping worm gear and a second gear meshed with said first gear; and wherein said first gear and said second gear are bevel gears.

4. The worm differential of claim 3 wherein said first enveloping worm gear having a number of gear teeth less than twenty four, and wherein said first enveloping worm having a screw-thread engaging said gear teeth of said first enveloping worm gear.

5. A worm differential, comprising:

a differential case;

first and second axle shafts rotatably supported by said differential case;

a first worm gear mounted to said first axle shaft and a second worm gear mounted to said second axle shaft;

a pair of first compound gears rotatably supported by said differential case and each having a first worm and a first gear, said first worm of said pair of first compound gears being meshed with said first worm gear;

a pair of second compound gears rotatably supported by said differential case and each having a second worm meshed with said second worm gear and a second gear meshed with one of said first gears of said pair of first compound gears; and said first compound gears being aligned perpendicular to said second compound gears.

6. The worm differential of claim 5 wherein said first worm gear is an enveloping worm gear having a number of gear teeth less than twenty four, and wherein said first worm is an enveloping worm having a screw-thread engaging said gear teeth of said first worm gear.

7. A worm differential, comprising:

a differential case;

first and second axle shafts rotatably supported by said differential case;

a first worm gear mounted to said first axle shaft and a second worm gear mounted to said second axle shaft;

a first compound gear rotatably supported by said differential case and having a first worm and a first bevel gear, said first worm being meshed with said first worm gear;

a second compound gear rotatably supported by said differential case and having a second worm meshed with said second worm gear and a second bevel gear meshed with said first bevel gear.

8. The worm differential of claim 7 wherein said first worm gear is an enveloping worm gear having a number of gear teeth less than twenty four, and wherein said first worm is an enveloping worm having a screw-thread engaging said gear teeth of said first worm gear.

\* \* \* \* \*